(12) United States Patent
Kobayashi et al.

(10) Patent No.: US 7,808,705 B2
(45) Date of Patent: Oct. 5, 2010

(54) WAVELENGTH-SELECTIVE SWITCH (75) Inventors: Kenji Kobayashi, Yokohama (JP); Toshiki Nishizawa, Yokohama (JP); Yuji Mitsuhashi, Yokohama (JP)

(73) Assignee: NTT Electronics Corporation, Kanagawa (JP)

( * ) Notice: Subject to any disclaimer, the term of this patent is extended or adjusted under 35 U.S.C. 154(b) by 0 days.

(21) Appl. No.: 12/664,862

(22) PCT Filed: May 30, 2008

(86) PCT No.: PCT/JP2008/060014

§ 371 (c)(1),
(2), (4) Date: Dec. 15, 2009

(87) PCT Pub. No.: WO2008/155985

PCT Pub. Date: Dec. 24, 2008

(65) Prior Publication Data

US 2010/0188724 A1    Jul. 29, 2010

(30) Foreign Application Priority Data

Jun. 18, 2007 (JP) .............................. 2007-160126

(51) Int. Cl.
*G02B 27/10* (2006.01)
*G02B 6/32* (2006.01)
*H04J 14/02* (2006.01)

(52) U.S. Cl. ........................... 359/618; 385/33; 398/79; 398/82; 398/88

(58) Field of Classification Search ................. 359/618, 359/566; 385/22, 24, 31, 33; 398/43, 79, 398/82, 88
See application file for complete search history.

(56) References Cited

U.S. PATENT DOCUMENTS 7,088,885 B1 * 8/2006 Wang .......................... 385/24
2004/0179279 A1    9/2004 Kawahata

FOREIGN PATENT DOCUMENTS

| JP | 2004-258409 A1 | 9/2004 |
| JP | 2004-272116 A | 9/2004 |
| JP | 2005-077964 A | 3/2005 |
| JP | 2005-338475 A | 12/2005 |
| JP | 2006-178207 A | 7/2006 |

* cited by examiner

*Primary Examiner*—Jack Dinh
(74) *Attorney, Agent, or Firm*—Ohlandt, Greeley, Ruggiero & Perle, L.L.P.

(57) ABSTRACT

A wavelength-selective switch with a switch unit having a lens array, a first lens and a beam expander, and a branching unit having a second lens, a diffraction grating, a third lens and a mirror, in which the switch unit and the branching unit are accommodated in independent casings, and a confocal point of the light transmitted through the first lens and the light transmitted through the second lens are arranged on a connecting surface of the casing of the switch unit and the casing of the branching unit.

8 Claims, 6 Drawing Sheets

FIG. 7

WAVELENGTH-SELECTIVE SWITCH

CROSS-REFERENCE TO PRIOR APPLICATIONS

This is the U.S. National Phase Application under 35 U.S.C. §371 of International Patent Application No. PCT/JP2008/060014 filed May 30, 2008, which claims the benefit of Japanese Patent Application No. 2007-160126 filed Jun. 18, 2007, both of which are incorporated by reference herein. The International Application was published in Japanese on Dec. 24, 2008 as WO2008/155985 A1 under PCT Article 21(2).

TECHNICAL

The present invention relates to a wavelength-selective switch capable of multiplexing or demultiplexing light of different wavelength in optical wavelength division multiplexing transmission.

BACKGROUND

Along with the popularization of the optical wavelength division multiplexing transmission, the wavelength-selective switch for multiplexing or demultiplexing an optical signal for each wavelength is a key device of optical communication.

Figure 7:
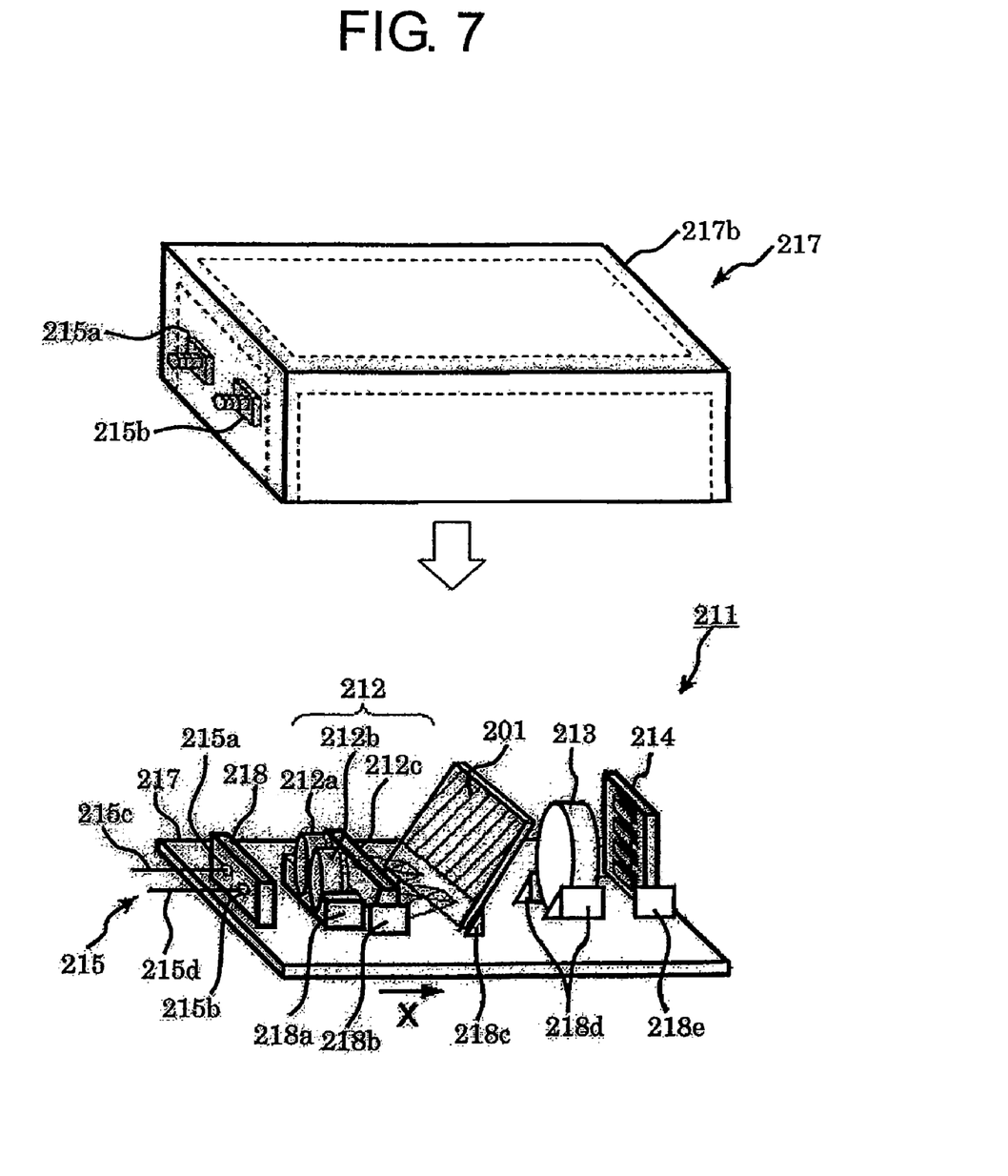
FIG. 7 is a schematic configuration diagram of an optical switch module.

A schematic configuration diagram of an optical switch module is shown in FIG. 7. An optical switch module 211 has a virtually imaged phase array (VIPA) 201, collimate lenses 212a and 212b, a semi-cylindrical lens 212c, a focus lens 213, a micro mirror array 214, an optical input/output port 215, connectors for optical fiber 215a and 215b, optical fibers 215c and 215d, a metal casing 217 and supporting tables 218a to 218e, for example.

The optical switch module 211 has two optical ports, emits light from end faces of the optical fibers 215c and 215d to make the same parallel light by the collimate lenses 212a and 212b, and thereafter the light converges on the VIPA 201 by the semi-cylindrical lens 212c to enter. The VIPA 201 emits the light by maintaining separate emission angles according to wavelengths $\lambda_1$ to $\lambda_n$. The focus lens 213 focuses two lights on one point on a micro mirror of the micro mirror array 214. The micro mirror array 214 has a plurality of micro mirrors corresponding to the wavelengths $\lambda_1$ to $\lambda_n$. By changing the angle of the micro mirror, an optical path of the entered light may be returned to the optical path of the light for each of the wavelengths $\lambda_1$ to $\lambda_n$ or reflected to the optical path of the light, and switching for each wavelength of the light may be performed between the two optical ports.

Patent Document 1: Japanese Patent Application Laid-Open No. 2004-258409.

However, the conventional wavelength-selective switch has a problem that a position of an optical component easily shifts when fixing the optical component with adhesive and by soldering. Also, in the conventional wavelength-selective switch, when the position of the optical component is shifted and fixed, it is difficult to return the same to an original position. Further, in a case of fixing with adhesive and by soldering, at an operational temperature of the conventional wavelength-selective switch, for example, the operational temperature from −5° C. to 70° C., the position of the optical component might shift due to an effect of thermal stress to adhesive and soldering, so that there are some concerns about long-term use.

SUMMARY

Therefore, an aspect of the present invention is to provide the wavelength-selective switch in which the position of the optical component hardly shifts when fixing the optical component.

The wavelength-selective switch according to an embodiment of the present invention is divided into a switch unit and a branching unit and they are connected at a confocal point.

Preferably, the wavelength-selective switch according to an embodiment of the present invention includes: a switch unit having a lens array arranged so as be opposed to a plurality of optical input/output ports horizontally linearly provided for inputting and outputting light including one or more wavelengths, for making the light from the optical input/output ports parallel light, a first lens arranged on a side opposite to the optical input/output ports across the lens array, for making the light from the lens array converging light, and a beam expander arranged on a side opposite to the optical input/output ports across the first lens and between the first lens and a focal point of the first lens for directly focusing the converging light from the first lens in an array direction of the optical input/output ports and focusing the light transmitted through the first lens so as to be larger in a direction orthogonal to the array direction of the optical input/output ports on the focal point of the first lens; and a branching unit having a second lens arranged so as to make the light from the beam expander the parallel light, a diffraction grating for transmitting the light transmitted through the second lens at angles different for each wavelength on a grating surface obtained by forming a plurality of gratings parallel to the array direction of the optical input/output port on a surface receiving the light transmitted through the second lens out of the light input and output from the optical input/output ports, a third lens arranged on a side opposed to the second lens across the diffraction grating, and a plurality of mirrors in each of which alight reflection angle is set such that each of the mirrors reflects the light output from the optical input/output ports and transmitted through the lens array, the first lens, the beam expander, the second lens, the diffraction grating and the third lens, and each reflected light is transmitted again through the third lens, the diffraction grating, the second lens, the beam expander, the first lens and the lens array to converge on any one of the optical input/output ports; wherein the switch unit and the branching unit are accommodated in independent casings, and a confocal point of the light transmitted through the first lens and the light transmitted through the second lens is arranged on a connecting surface of the casing of the switch unit and the casing of the branching unit.

In the wavelength-selective switch, the position of the optical component hardly shifts when fixing the optical component.

It is preferred that an optical axis of the light transmitted through the first lens and an optical axis of the light transmitted through the second lens substantially conform to each other in the wavelength-selective switch according to an embodiment of the present invention.

The wavelength-selective switch may reduce light loss.

It is preferred that the casing of the switch unit has a coaxial structure in the wavelength-selective switch according to an embodiment of the present invention.

In the wavelength-selective switch, since a position of the light transmitted through the first lens may be adjusted along three axes and in a rotational direction to be fixed by making the casing of the switch unit the coaxial structure, an effect of the positional shift of the optical component may be reduced.

It is preferred that the plurality of mirrors of the branching unit are accommodated in a casing having the coaxial structure in the wavelength-selective switch according to an embodiment of the present invention.

In the wavelength-selective switch, since the position of the light transmitted through the third lens 70 may be adjusted along the three axes and in the rotational direction to be fixed by accommodating the plurality of mirrors in the casing having the coaxial structure, the effect of the positional shift of the optical component may be reduced.

The present invention may provide the wavelength-selective switch in which the position of the optical component hardly shifts when fixing the optical component.

BRIEF DESCRIPTION OF THE DRAWINGS

FIG. 1(*a*) and FIG. 1(*b*) are schematic configuration diagrams of wavelength-selective switches according to an embodiment. FIG. 1(*a*) shows the wave length-selective switch on an x-z plane, and FIG. 1(*b*) shows the wavelength-selective switch on a y-z plane.

DETAILED DESCRIPTION

Hereinafter, the invention of the present application is described in detail by describing embodiments; however, the invention of the present application is not interpreted so as to be limited to a following description. Meanwhile, although the following embodiment is described for a configuration in which light is output from one optical input/output port (optical input/output port 101*d* to be described) to other optical input/output ports (optical input/output ports 101*a* to 101*g* to be described) by being divided into each wavelength is described, this may be similarly described for a configuration to divide the light output from any one of the other optical input/output ports 101*a* to 101*g* into each wavelength to input to the one optical input/output port 101*d*.

Figures 1A, 1B:
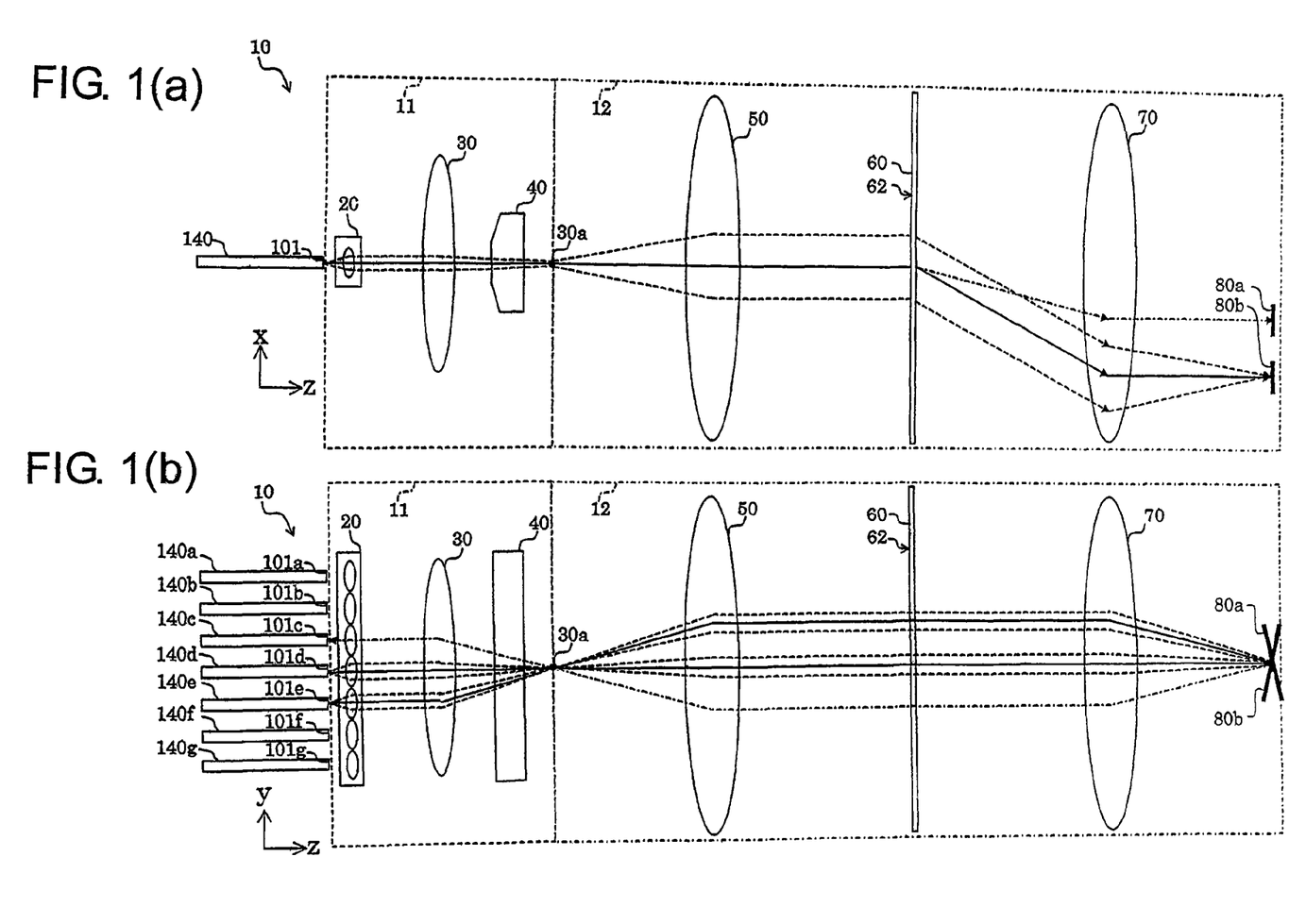

A schematic configuration diagram of a wavelength-selective switch according to an embodiment is shown in FIG. 1. FIG. 1(*a*) shows the wavelength-selective switch on an x-z plane, and FIG. 1(*b*) shows the wavelength-selective switch on a y-z plane. In FIG. 1, the light is output from the optical input/output port 101*d* and is demultiplexed at predetermined wavelength intervals by a diffraction grating 60, and for an optical path to a mirror 80*b*, light flux is represented by a broken line and a principal axis light beam is represented by a solid line, in order to indicate effects of a lens array 20, a first lens 30, a beam expander 40 and a second lens 50. For another optical path, only the principal axis light beam is represented by the solid line or a dashed-dotted line in order to avoid complication of the drawing.

A wavelength-selective switch 10 according to an embodiment is the wavelength-selective switch 10 provided with a switch unit 11 having the lens array 20 arranged so as to be opposed to a plurality of optical input/output ports 101 horizontally linearly provided for inputting and outputting the light including one or more wavelengths, for making the light from the optical input/output ports 101 parallel light, the first lens 30 arranged on a side opposite to the optical input/output ports 101 across the lens array 20 for making the light from the lens array 20 converging light, and the beam expander 40 arranged on a side opposite to the optical input/output ports 101 across the first lens 30 and between the first lens 30 and a focal point 30*a* of the first lens 30, for directly focusing the converging light from the first lens 30 in an array direction of the optical input/output ports 101 and focusing the light transmitted through the first lens 30 so as to be larger in a direction orthogonal to the array direction of the optical input/output ports 101 on the focal point 30*a* of the first lens 30; and a branching unit 12 having the second lens 50 arranged so as to make the light from the beam expander 40 the parallel light, the diffraction grating 60 for transmitting the light transmitted through the second lens 50 at angles different for each wavelength on a grating surface 62 obtained by forming a plurality of gratings parallel to an arrangement direction of the optical input/output ports 101 on a surface, which receives the light transmitted through the second lens 50 out of the light input and output from the optical input/output port 101, a third lens 70 arranged on a side opposite to the second lens 50 across the diffraction grating 60, and a plurality of mirrors in each of which a light reflection angle is set such that each of them reflects the light output from the optical input/output ports 101 and transmitted through the lens array 20, the first lens 30, the beam expander 40, the second lens 50, the diffraction grating 60 and the third lens 70, and each reflected light is transmitted again through the third lens 70, the diffraction grating 60, the second lens 50, the beam expander 40, the first lens 30 and the lens array 20 to converge on any one of the optical input/output ports 101, in which the switch unit 11 and the branching unit 12 are accommodated in independent casings (represented by a dotted line and the dashed-dotted line), and a confocal point (in FIG. 1, the confocal point conforms to the focal point 30*a* of the first lens 30) of the light transmitted through the first lens 30 and the light transmitted through the second lens 50 is arranged on a connecting surface of the casing of the switch unit 11 and the casing of the branching unit 12. The beam expander 40 may be composed of a cylindrical convex lens, which directly focuses the converging light from the first lens 30 in the array direction of the optical input/output ports, and focuses the light transmitted through the first lens 30 so as to be larger in the direction orthogonal to the array direction of the optical input/output ports.

There are a plurality of optical input/output ports 101. Although seven optical input/output ports 101*a* to 101*g* are illustrated in FIG. 1, the number of ports arranged may be an optical number equal to or larger or smaller than this. To the optical input/output ports 101*a* to 101*g*, for example, optical fibers 140*a* to 140*g* are connected for each of the optical input/output ports 101*a* to 101*g*, respectively, as shown in FIG. 1, or optical waveguides (not shown) is connected. Also, the optical input/output ports 101*a* to 101*g* input and output the light including one or more wavelengths propagating through the optical fibers 140*a* to 140*g*, respectively. Also, the optical input/output ports 101*a* to 101*g* are horizontally and linearly provided. Although the optical input/output ports 101*a* to 101*g* are arranged such that a direction of the light output from the optical input/output ports 101*a* to 101*g* is parallel to a z axis direction as shown in FIG. 1(b), any direction is possible as long as this is converted into the parallel light by the lens array 20.

As the lens array 20, there is a micro lens array, for example.

As the first lens 30, there are, for example, a convex lens, a doublet lens obtained by bonding to combine appropriate convex lens and concave lens in order to reduce optical aberration, a lens obtained by combining a plurality of lenses such as a triplet lens and an aspheric lens.

The beam expander 40 is arranged such that a convex surface thereof faces toward the first lens 30. As shown in FIG. 1(a), the beam expander 40 focuses the light transmitted through the first lens 30 so as to be larger in the direction orthogonal to the array direction of the optical input/output ports 101, that is to say, in an x-axis direction. On the other hand, as shown in FIG. 1(b), the beam expander 40 directly focuses the converging light from the first lens 30 in the array direction of the optical input/output ports 101, that is to say, in a y-axis direction. Therefore, the converging light from the first lens 30 enlarges in the x-axis direction as this passes through the focal point 30a of the first lens 30 to approach the second lens 50, and becomes the parallel light at the second lens 50. A cross-section of the light at the second lens 50 is an oval enlarged in the x-axis direction.

The casing of the switch unit 11 is made of metal, for example, and accommodates the lens array 20, the first lens 30 and the beam expander 40.

As the second lens 50 and the third lens 70, there are ones similar to the first lens 30.

On the grating surface 62, a plurality of gratings parallel to the y-axis direction in FIG. 1(b) are formed so as to be parallel to the x-axis direction in FIG. 1(a). The gratings may be a plurality of concavo-convex grooves formed on the grating surface 62, or may be that in which a portion to reflect the light and a portion to absorb the light are alternatively arranged. According to this, as shown in FIG. 1(a), the light transmitted through the second lens 50 is transmitted in the x-axis direction on the grating surface 62 of the diffraction grating 60 with angles different for each wavelength. Meanwhile, this is directly transmitted in the z-axis direction in FIG. 1(b). Although the grating surface 62 of the diffraction grating 60 faces the second lens 50 in FIG. 1 for simplicity, in general, this is inclined relative to an optical axis (z-axis) such that a normal line of the grating surface 62 is within the x-z plane.

Although two mirrors 80a and 80b are illustrated in FIG. 1, a plurality of mirrors may be arranged for each wavelength according to the number of wavelengths of the light propagating through the optical fiber 140. Hereinafter, although it is described focusing on the mirror 80a, this is similar for the mirror 80b. Although it is set such that the mirrors 80a and 80b focus the light on the optical input/output ports 101c and 101e, respectively, it is possible to focus on either of the optical input/output ports 101a to 101g according to the angles. For example, when inclined upward as the mirror 80a, it is possible to focus on the input/output port 101c, on the other hand, when inclined downward as the mirror 80b, it is possible focus on the optical input/output port 101e. In this manner, by changing the angle of the mirror 80a, wavelength selection becomes possible. A small wavelength-selective switch may be realized by applying a micro electro mechanical systems (MEMS) mirror, for example, as the mirror 80a.

It is preferable in the wavelength-selective switch 10 that the first and second lenses 30 and 50 compose a confocal optical system, that is to say, the focal point 30a of the first lens 30 and a focal point of the second lens 50 conform to each other. Also, it is preferable that the third lens 70 is arranged with a distance the same as the distance between the second lens 50 and the diffraction grating 60.

The casing of the branching unit 12 is, for example, made of metal, and accommodates the second lens 50, the diffraction grating 60, the third lens 70 and the mirrors 80a and 80b.

In the wavelength-selective switch 10 according to an embodiment, it is preferable that an optical axis of the light transmitted through the first lens 30 and an optical axis of the light transmitted through the second lens 50 substantially conform to each other. In the wavelength-selective switch 10, the light does not leak at the first and second lenses 30 and 50, so that light loss may be reduced.

As described above, since the wavelength-selective switch 10 may divide the light of a plurality of wavelengths output from any one of the optical input/output ports 101a to 101g to other optical input/output port (any one of the optical input/output ports 101a to 101g), and multiplex the light output from a plurality ones of the optical input/output ports 101a to 101g by another optical input/output port (any one of the optical input/output ports 101a to 101g), this may be applied as an optical multiplexing/demultiplexing circuit for wavelength multiplexing and a wavelength relocation-type add-drop wavelength multiplexing circuit when realizing an optical wavelength division multiplexing transmission network.

Figure 2:
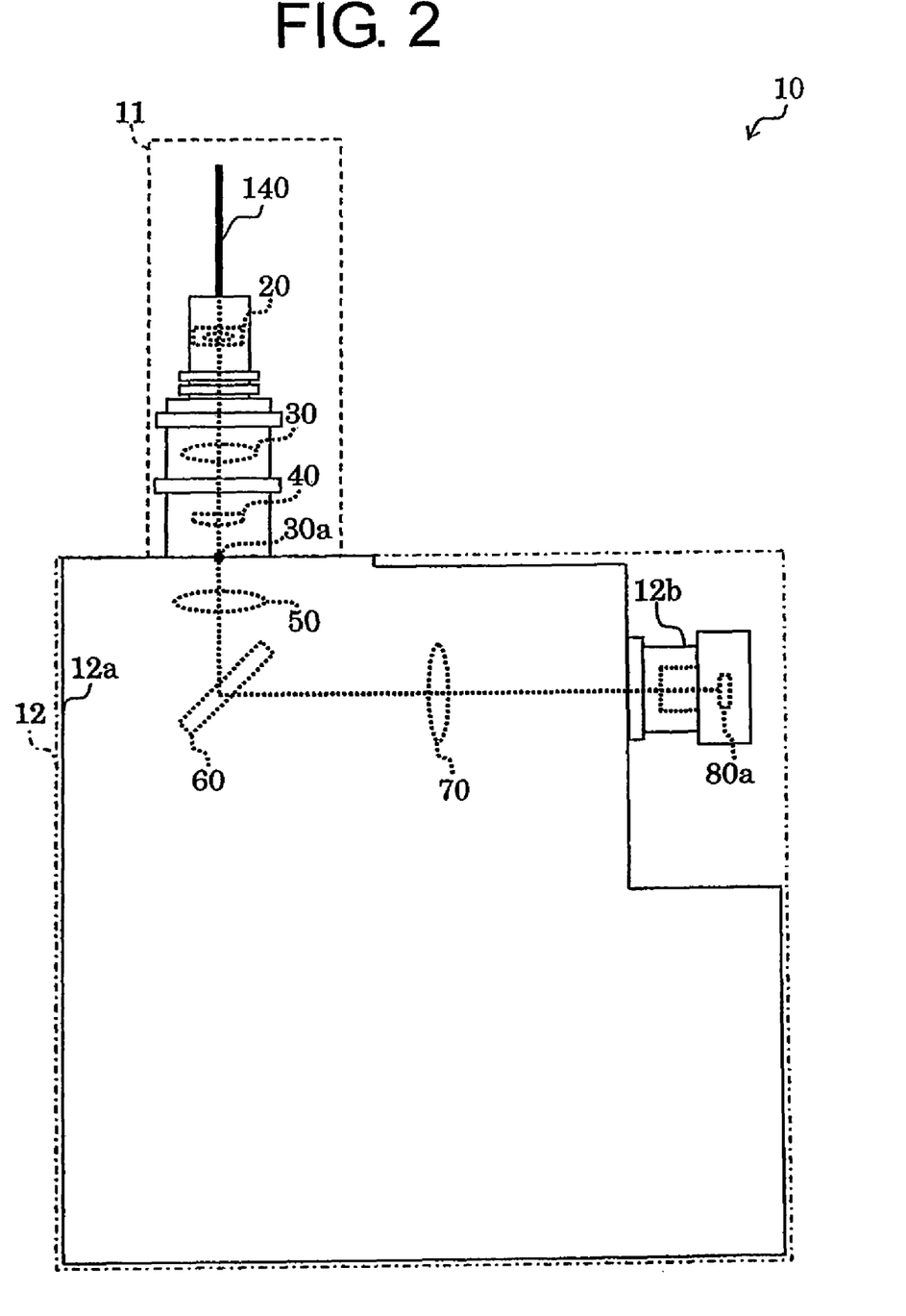
FIG. 2 is a top perspective view of the wavelength-selective switch according to an embodiment.

A top perspective view of the wavelength-selective switch according to an embodiment is shown in FIG. 2. As described above, the wavelength-selective switch 10 is provided with the switch unit 11 and the branching unit 12. Also, in FIG. 2, the lens array 20, the first lens 30 and the beam expander 40 accommodated in the casing of the switch unit 11, and the second lens 50, the diffraction grating 60, the third lens 70 and the mirror 80a accommodated in the casing of the branching unit 12 are represented by the dotted line. The casing of the switch unit 11 has a holder made of metal for accommodating the lens array 20, the first lens 30 and the beam expander 40, for example. Also, the casing of the switch unit 11 is mounted on a side surface of the casing of the branching unit 12 by means of a collar made of metal. Herein, in the wavelength-selective switch, it is preferable that the casing of the switch unit 11 and the casing of the branching unit 12 are YAG laser welded using a YAG laser. Since the YAG laser welding is short-pulse laser welding, joining strength thereof is strong, and positions of the casing of the switch unit 11 and the casing of the branching unit 12 are not easily shifted, so that positional shift hardly occurs after an elapsed time period compared to fixing using adhesive. Meanwhile, the casing of the switch unit 11 is described later in detail.

The casing of the branching unit 12 is composed of a box-like metal casing 12a and an MEMS casing 12b. The second lens 50, the diffraction grating 60 and the third lens 70 are accommodated in the metal casing 12a. Also, the MEMS casing 12b has the holder made of metal for accommodating the mirror 80a and is mounted on the side surface of the metal casing 12a by means of the collar made of metal. Also, holes are provided on the casing of the switch unit 11 and the casing of the branching unit 12 so as to ensure an optical path. The hole is sealed by a transparent window such as borosilicate glass and sapphire glass. For the reason similar to the above description, in the wavelength-selective switch, it is preferable that the metal casing 12a and the MEMS casing 12b are YAG laser welded using the YAG laser. Herein, the MEMS casing 12b may have a coaxial structure.

Figure 3:
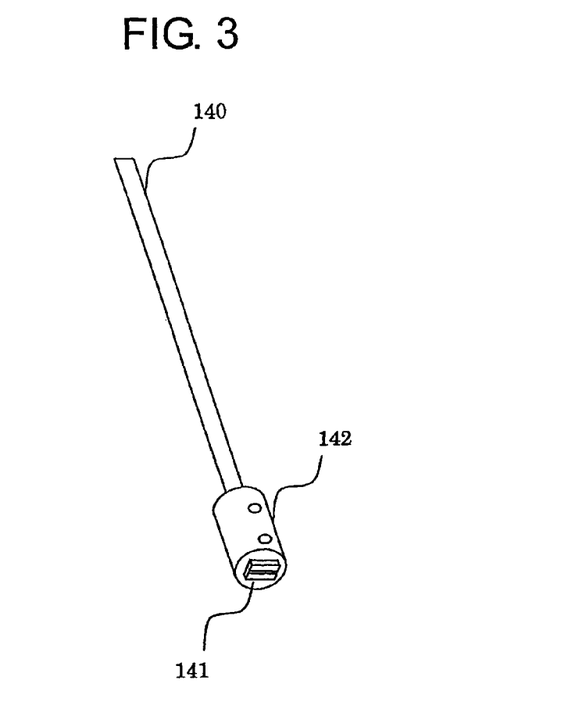
FIG. 3 is a first external view of a manufacturing process of a switch unit according to an embodiment.
Figure 4:
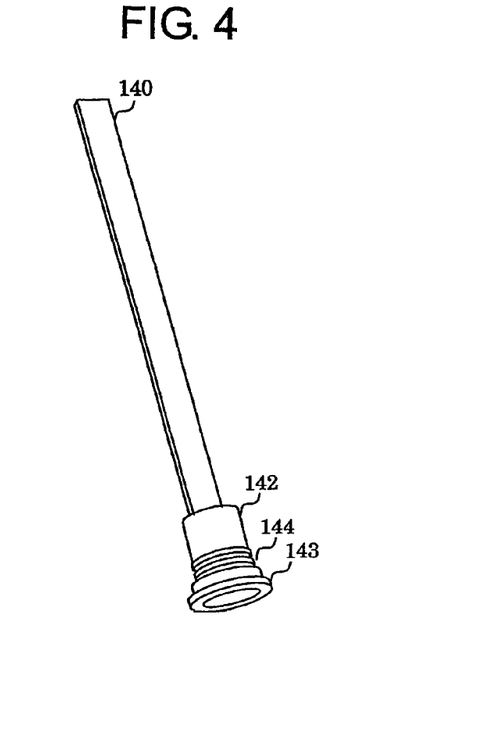
FIG. 4 is a second external view of the manufacturing process of the switch unit according to an embodiment.
Figure 5:
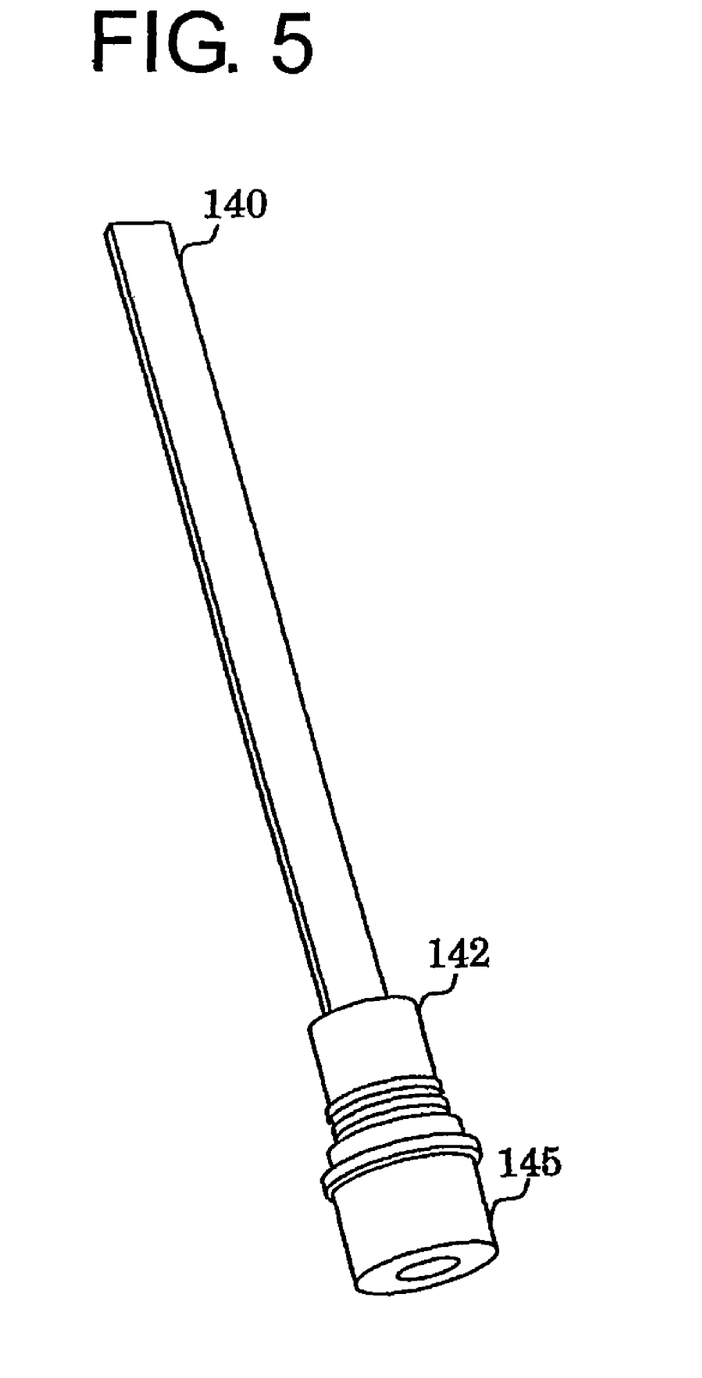
FIG. 5 is a third external view of the manufacturing process of the switch unit according to an embodiment.
Figure 6:
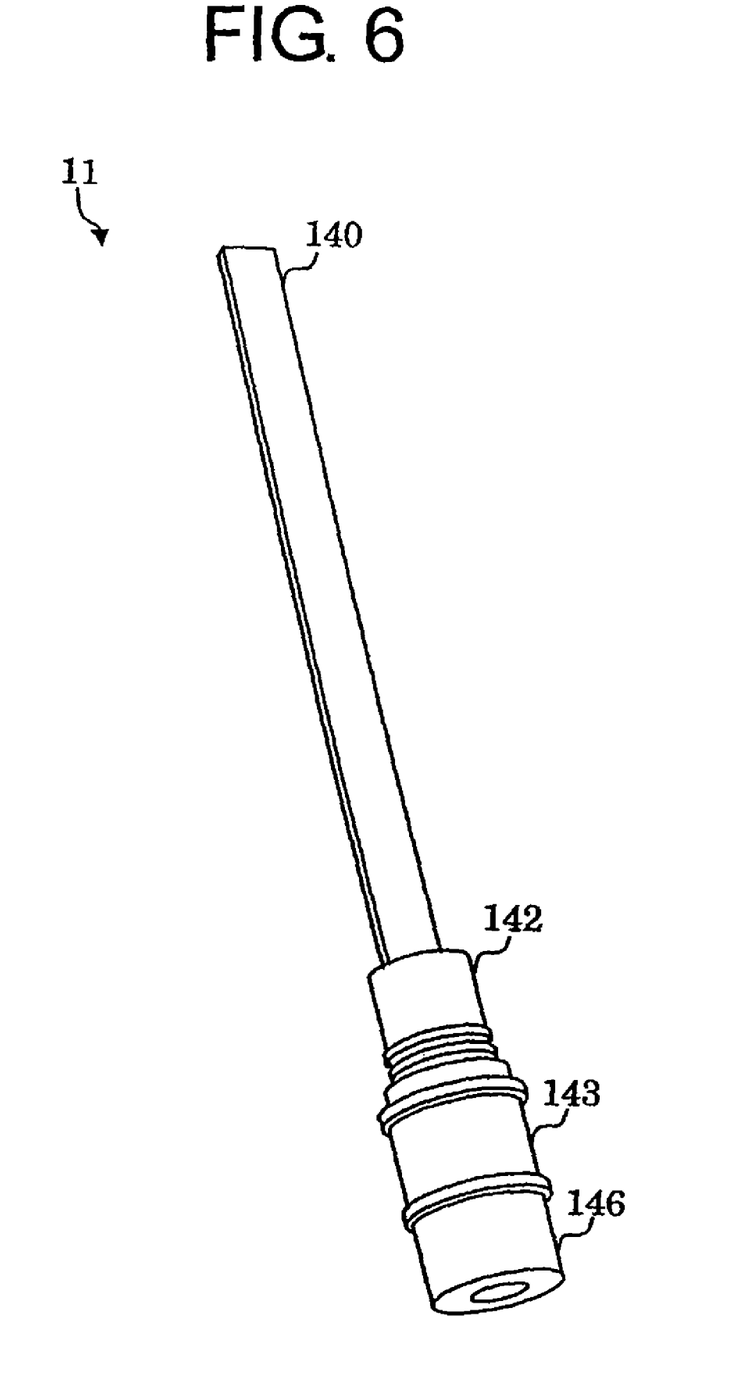
FIG. 6 is a fourth external view of the manufacturing process of the switch unit according to an embodiment.

FIGS. 3 to 6 show an external view of a manufacturing process of the switch unit in an embodiment. The optical fiber 140 is a tape fiber obtained by bundling a plurality of fibers, for example. As shown in FIG. 3, one end of the optical fiber 140 is such that glasses 141 are mounted on both sides of the optical fiber 140 in order to hold the same. Further, a coaxial-type holder 142 is mounted on an outside thereof. Also, as shown in FIG. 4, a metal holder 143 in which the lens array is accommodated and the optical fiber 140 are connected by means of a metal collar 144. Then, as shown in FIG. 5, the holder 142 and a metal holder 145 in which the first lens 30 is accommodated are connected. Then, as shown in FIG. 6, the holder 145 and a metal holder 146 in which the beam expander 40 is accommodated are connected. In this manner, the switch unit may be manufactured. For the reason similar to the above description, in the wavelength-selective switch, the holders 142 and 143, the metal collar 144 and the holders 145 and 146 are preferably YAG laser welded using the YAG laser.

In the wavelength-selective switch 10 according to an embodiment, it is further preferable that the casing of the switch unit 11 has the coaxial structure. By making the casing of the switch unit 11 the coaxial structure, a position of the light transmitted through the first lens 30 may be adjusted along three axes and in a direction of rotation around a coaxial central axis, and an arbitrary edge portion of contacting coaxial structure may be fixed by the YAG laser welding, so that an effect of positional shift of the optical component may be reduced. As the coaxial structure of the switch unit 11, for example, the holders 142 and 143, the metal collar 144 and the holders 145 and 146 may be made to have the coaxial structure.

In the wavelength-selective switch 10 according to an embodiment, it is further preferable that a plurality of mirrors 80a are accommodated in the casing having the coaxial structure. By accommodating the plurality of mirrors 80a in the casing having the coaxial structure, the position of the light transmitted through the third lens 70 may be adjusted along the three axes and in the direction of rotation around the coaxial central axis, and an arbitrary edge portion of the contacting coaxial structure may be fixed by the YAG laser welding, so that the effect of the positional shift of the optical component may be reduced. For example, the MEMS casing 12b is made to have the coaxial structure.

The wavelength-selective switch according to the present invention may multiplexing or demultiplexing the light of different wavelength, and is applicable as the optical multiplexing/demultiplexing circuit for wavelength multiplexing and the wavelength relocation-type add-drop wavelength multiplexing circuit when realizing the optical wavelength division multiplexing transmission network.

While the invention has been particularly shown and described with reference to preferred embodiments thereof, it will be understood by those skilled in the art that various changes in form and details may be made therein without departing from the spirit and scope of the invention

REFERENCE NUMERALS

10: wavelength-selective switch
11: switch unit
12: branching unit
12a: metal casing
12b: MEMS casing
20: lens array
30: first lens
30a: focal point (confocal point)
40: beam expander
50: second lens
60: diffraction grating
62: grating surface
70: third lens
80a, 80b: mirror
101: optical input/output port
140: optical fiber
141: glass
142, 143, 145, 146: holder
144: metal collar
201: VIPA
211: optical switch module
212: optical system
212a, 212b: collimate lens
212c: semi-cylindrical lens
213: optical system (focus lens)
214: micro mirror array
215: optical input/output port
215a, 215b: connector for optical fiber
215c, 215d: optical fiber
217: metal casing

The invention claimed is:

1. A wavelength-selective switch, comprising:
a switch unit having a lens array arranged so as be opposed to a plurality of optical input/output ports horizontally linearly provided for inputting and outputting light including one or more wavelengths, for making the light from the optical input/output ports parallel light, a first lens arranged on a side opposite to the optical input/output ports across the lens array, for making the light from the lens array converging light, and a beam expander arranged on a side opposite to the optical input/output ports across the first lens and between the first lens and a focal point of the first lens for directly focusing the converging light from the first lens in an array direction of the optical input/output ports and focusing the light transmitted through the first lens so as to be larger in a direction orthogonal to the array direction of the optical input/output ports on the focal point of the first lens; and
a branching unit having a second lens arranged so as to make the light from the beam expander the parallel light, a diffraction grating for transmitting the light transmitted through the second lens at angles different for each wavelength on a grating surface obtained by forming a plurality of gratings parallel to the array direction of the optical input/output port on a surface receiving the light transmitted through the second lens out of the light input and output from the optical input/output ports, a third lens arranged on a side opposed to the second lens across the diffraction grating, and a plurality of mirrors in each of which a light reflection angle is set such that each of the mirrors reflects the light output from the optical input/output ports and transmitted through the lens array, the first lens, the beam expander, the second lens, the diffraction grating and the third lens, and each reflected light is transmitted again through the third lens, the diffraction grating, the second lens, the beam expander, the first lens and the lens array to converge on any one of the optical input/output ports; wherein
the switch unit and the branching unit are accommodated in independent casings, and a confocal point of the light transmitted through the first lens and the light transmitted through the second lens is arranged on a connecting surface of the casing of the switch unit and the casing of the branching unit.

2. The wavelength-selective switch according to claim 1, wherein an optical axis of the light transmitted through the first lens and an optical axis of the light transmitted through the second lens substantially conform to each other.

3. The wavelength-selective switch according to claim 2, wherein, in the switch unit, the casing has a coaxial structure.

4. The wavelength-selective switch according to claim 3, wherein the plurality of mirrors of the branching unit are accommodated in a casing having a coaxial structure.

5. The wavelength-selective switch according to claim 2, wherein the plurality of mirrors of the branching unit are accommodated in a casing having a coaxial structure.

6. The wavelength-selective switch according to claim 1, wherein, in the switch unit, the casing has a coaxial structure.

7. The wavelength-selective switch according to claim 6, wherein the plurality of mirrors of the branching unit are accommodated in a casing having a coaxial structure.

8. The wavelength-selective switch according to claim 1, wherein the plurality of mirrors of the branching unit are accommodated in a casing having a coaxial structure.

* * * * *